Figure 3:
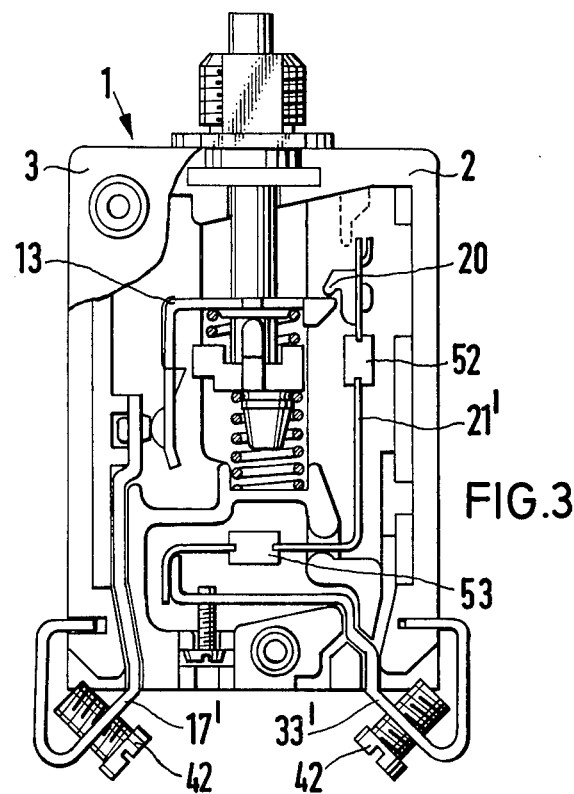

United States Patent [19]

Krasser et al.

[11] 4,044,325

[45] Aug. 23, 1977

[54] PUSHBUTTON ACTUATED EXCESS CURRENT SWITCH

[75] Inventors: Fritz Krasser; Konrad Heydner; Horst Ellenberger, all of Altdorf, Germany

[73] Assignee: Ellenberger & Poensgen GmbH, Altdorf, Germany

[21] Appl. No.: 649,804

[22] Filed: Jan. 16, 1976

[30] Foreign Application Priority Data

Jan. 23, 1975 Germany .............................. 2502579
Mar. 14, 1975 Germany .............................. 2511223

[51] Int. Cl.$^2$ ........................................... H01H 71/58
[52] U.S. Cl. ...................................... 337/66; 337/113
[58] Field of Search ................... 337/37, 52, 62, 66, 337/69, 74, 77, 99, 113

[56] References Cited

U.S. PATENT DOCUMENTS

3,559,139  1/1971  Ellenberg et al. .................... 337/66
3,708,776  1/1973  Ellenberg ............................ 337/66

FOREIGN PATENT DOCUMENTS

1,072,717  1/1960  Germany .............................. 337/66
1,943,273  3/1976  Germany .............................. 337/66

*Primary Examiner*—William H. Beha, Jr.
*Attorney, Agent, or Firm*—Spencer & Kaye

[57] ABSTRACT

A pushbutton actuated excess current switch with thermal tripping by a bimetal strip and with trip-free release. The pushbutton includes a component incorporating an actuating rod, a connecting bridge and a stud pointing away from the actuating rod and having an annular groove for receiving one end of a disconnecting spring the other end of which is supported in a switch housing, this component being unitarily made of synthetic material. Furthermore a threaded sleeve inserted into the switch housing and serving for guiding the pushbutton or the actuating rod as well as for affixing the switch housing is unitarily produced from synthetic material. The use of such unitarily produced components simplifies the manufacture of the switch.

14 Claims, 12 Drawing Figures

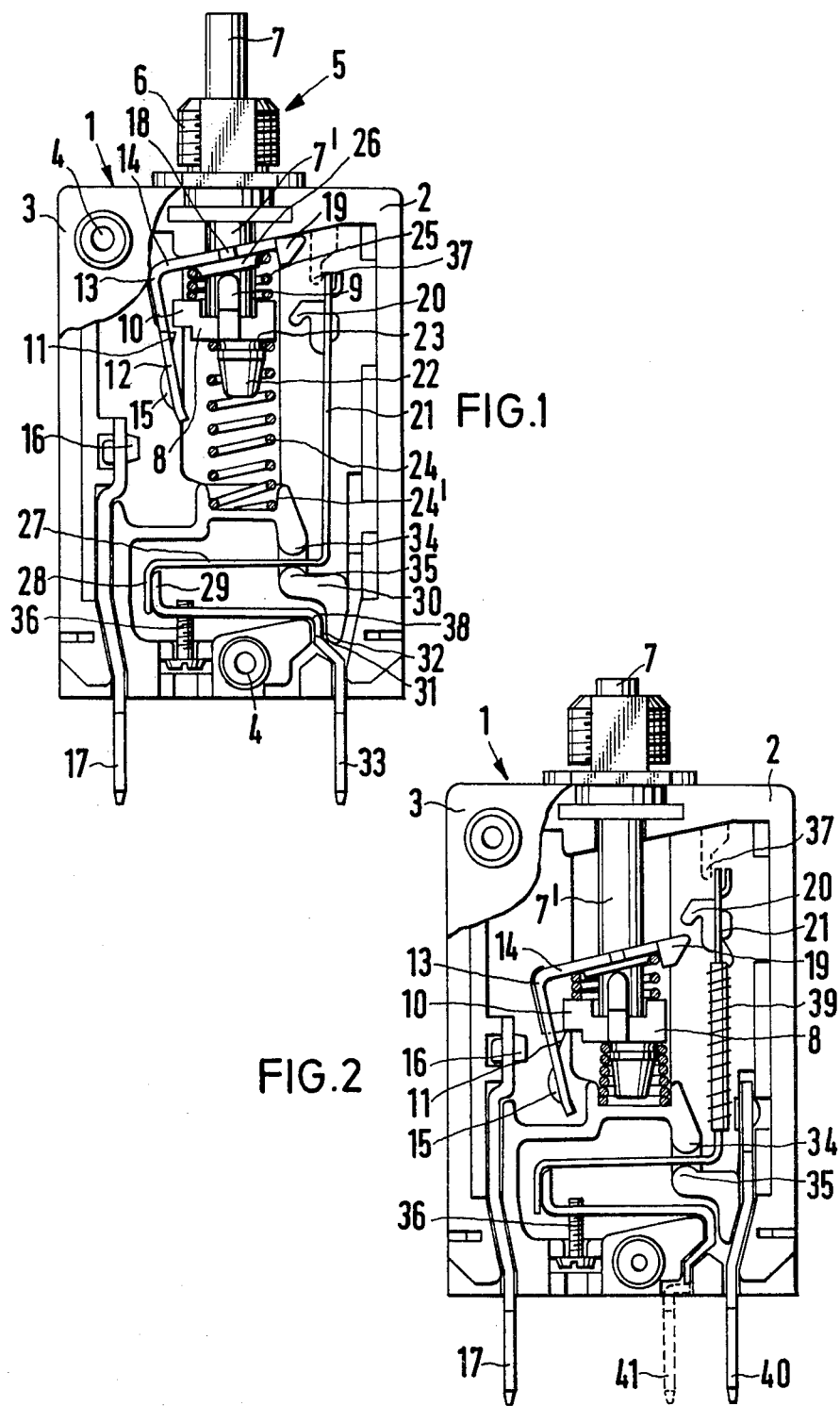

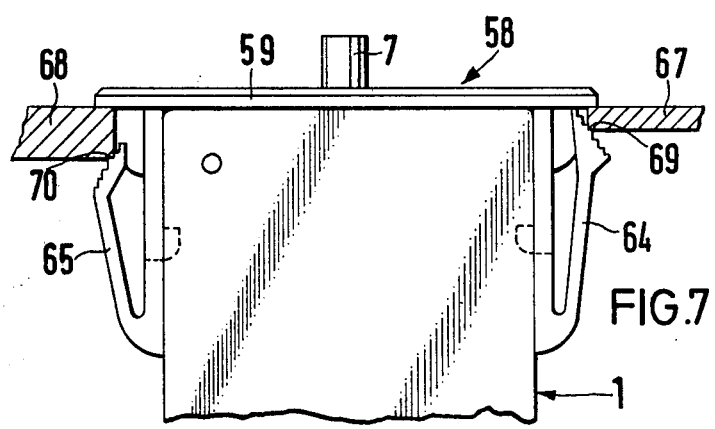
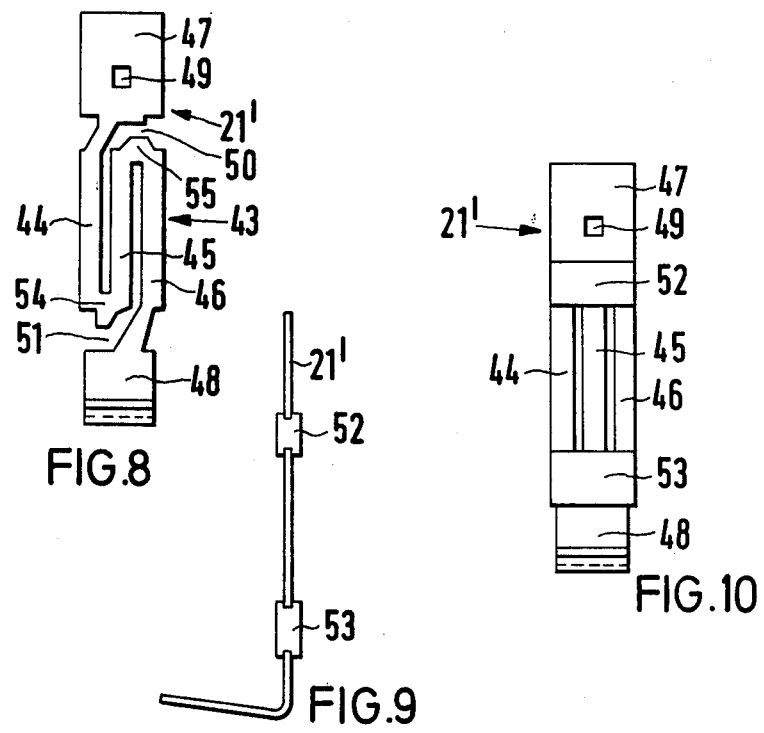

PUSHBUTTON ACTUATED EXCESS CURRENT SWITCH

The invention relates to a pushbutton actuated excess current switch with thermal tripping by a bimetal strip and with trip-free release and having a contact bridge formed as an angled lever which is freely pivotably mounted on lugs of a connecting bridge rigidly connected by an actuating rod to the pushbutton acted on by a disconnection spring and is displaceable in axial direction of the actuating rod counter to the force of a spring supported at the connecting bridge, and which contact bridge upon switching off is urged by the lugs against an oblique stop of the switch housing and upon switching on is entrained at a dog by a driver of the connecting bridge and caused to engage behind a retaining protuberance of the bimetal strip situated in axial direction of the actuating rod, the pushbutton and the actuating rod and the connecting bridge being made as one piece from synthetic material.

A pushbutton actuated excess current switch of this kind is known (U.S. Pat. No. 2,952,757) wherein the directly or indirectly heated bimetal strip is rigidly secured by a vertical bend to a threaded sleeve inserted, without play, into a corresponding recess of the housing. The threaded sleeve has an internal thread into which there is screwed a setscrew the threadward end of which has a conical portion acting on the vertical bend of the bimetal strip, so that the intensity of the releasing current can be set by means of the setscrew. In this known excess current switch, therefore, the bimetal strip must always have a vertical bend for setting the intensity of the releasing current and be secured to the threaded sleeve, whereby manufacture and securing of the bimetal strip and thus the production of the entire excess current switch is rendered more difficult and costly.

An object of the invention is to simplify the production of the excess current switch.

A further object of the invention is to obtain an easy setting of the bimetal strip.

A further object of the invention is to provide the excess current switch with a simple and space-saving temperature compensation.

A further object of the invention is to obtain a simple securing of the excess current switch.

A further object of the invention is to alternatively secure the excess current switch to a printed circuit board.

According to the invention the pushbutton and the actuating rod together with the connecting bridge and a stud pointing away from the actuating rod and having an annular groove for receiving the one end of the disconnection spring the other end of which is supported in the switch housing, are unitarily made of synthetic material, the bimetal strip has a right-angled bent portion substantially corresponding to its length the end of which is comparatively short and perpendicularly bent in the direction facing away from the bimetal strip and rigidly connected to a correspondingly long perpendicular bent portion of a bimetal strip carrier which is situated parallel to the right-angled bent portion of the bimetal strip and has in the region of the bimetal strip a perpendicularly bent portion directed away from the bimetal strip, secured in a corresponding groove-like recess of the housing and forming a connecting lug protruding from the housing, the right-angled bent portion of the bimetal strip is held with some play between two semicircular projections of the housing and near its junction with the bimetal strip there is screwed into the bimetal strip carrier a setscrew mounted so as to be rotatable in the housing but not axially displaceable, and the two semicircular projections are situated vertically below the retaining protuberance of the bimetal strip.

By virtue of the unitary formation of the pushbutton and the actuating rod with the connecting bridge as well as the stud having the annular groove the production of the excess current switch according to the invention is simplified; for large numbers of this structural component can be manufactured in a simple manner in a suitable form with invariable precision.

In the excess current switch according to the invention the bimetal strip is furthermore pivotably mounted between two semicircular projections, the setscrew being screwed into the bimetal carrier at a comparatively great distance from this point of mounting. Thereby results a comparatively long effort arm for setting the bimetal strip so that easy and precise setting of the bimetal strip is made possible. A further result of this arrangement is that the bimetal strip is easy to produce since it neither has a vertical bend nor a threaded bore for the setscrew, the setscrew being screwed into the bimetal carrier. Since, moreover, the two semicircular projections are located vertically below the retaining protuberance or keeper on the bimetal strip the contact bridge acted on by spring energy and bearing on the keeper of the bimetal strip exerts no bending forces but only longitudinally directed pulling forces on the bimetal strip, whereby the bimetal strip is preserved in good condition.

The known excess current switch (U.S. Pat. No. 2,952,757) has a threaded sleeve which is untwistably inserted into the switch housing and serves for guiding the pushbutton or the actuating rod as well as for affixing the switch housing. The threaded sleeve is formed as a turned piece of metal having an external thread machined therein. In further development of the invention the threaded sleeve is unitarily produced from synthetic material, whereby manufacture of the excess current switch according to the invention is simplified.

As is customary, the bimetal strip may or may not have a heating winding, i.e. it may be indirectly or directly heated. Furthermore, the bimetal strip devoid of a heating winding may be subdivided into three or more odd-numbering parallel arms situated longitudinally of the bimetal strip and connected in series. For the purpose of stabilising the bimetal strip the interconnected ends of two neighbouring arms are then firmly connected, by means of connectors of insulating material, to the third arm and to the portions of the bimetal strip which have no arms. Since the individual arms of the bimetal strip are then connected in series and have a smaller cross-section than the two ends of the bimetal strip an increased resistance of the bimetal strip will result, so that this bimetal strip may be employed instead of a bimetal strip provided with a heating winding and the manufacture of the excess current switch according to the invention is thereby simplified.

In further development of the invention an affixing frame of thermoplastic material may be slipped onto the housing of the excess current switch according to the invention, a long, plate-like portion of which frame contacts the pushbutton side and two shorter lateral portions perpendicular thereto contact the oppositely situated narrow sides of the housing, studs pointing toward one another being unitarily moulded to the shorter lateral portions and engaging into corresponding recesses of the oppositely situated narrow sides of the housing. At their lower ends the lateral portions have unitarily moulded, obliquely upwardly and outwardly directed resilient supporting arms provided with steps, which arms, when they have been introduced into a corresponding recess of a mounting plate, are supported by their steps at oppositely located edges of the recess. Under normal circumstances the excess current switch of the invention with its housing may be affixed to a plate by means of the threaded sleeve and a suitable nut. But affixing of the excess current switch according to the invention may alternatively be effected by means of the affixing frame of thermoplastic material. This mode of affixing has the advantage that it can be simply and rapidly executed. After introduction of the housing into a corresponding recess of a mounting plate the resilient supporting arms of the affixing frame are then supported by corresponding steps at oppositely located edges of the recess. In this context it is possible for two respective supporting arms to be moulded to each of the shorter lateral portions and to be of different thickness, the thicker supporting arm serving for affixing to thicker mounting plates and the thinner supporting arm for affixing to thinner mounting plates.

The excess current switch according to the invention may alternatively be secured to a printed circuit board. To this end the switch need only have at least two connecting lugs which are bent at right angles away from each other and are each screwed by means of a respective screw to a respective threaded bushing secured to the circuit board. In this way there is obtained on the one hand the electric connection of the excess current switch according to the invention and on the other hand a secure mechanical affixing.

So that when the bimetal strip cools off the retaining protuberance or keeper of the bimetal strip should not be able to shift relative to the two substantially semicircular projections of the housing, there is provided in the switch housing a stationary stop to which the keeper-equipped end of the bimetal strip adheres when in the cool state.

In order to provide the excess current switch according to the invention with a simple and space-saving temperature compensation there is disposed between the bimetal strip carrier and the right-angled bent portion of the bimetal strip a substantially U-shaped compensation bimetal strip one leg of which contacts the right-angled bent portion of the bimetal strip and the other leg of which contacts the bimetal strip carrier. By virtue of the arrangement of a substantially U-shaped compensation bimetal strip in the space between the right-angled bent portion of the bimetal strip and the bimetal strip carrier a simple and space-saving temperature compensation is obtained, which is easy to produce and instal.

In order to obtain on the one hand an electric insulation and on the other hand a thermal insulation between the right-angled bent portion of the bimetal strip and the compensation bimetal strip an insulating platelet is provided between the one leg of the compensation bimetal strip and the right-angled bent portion of the bimetal strip. For this reason the other leg of the compensation bimetal strip may be secured, e.g. welded, to the bimetal strip carrier. For simplification of installation the insulating platelet has studs at either side which engage into corresponding bores of the right-angled bent portion of the bimetal strip and of the one leg of the U-shaped compensation bimetal strip, and there is provided a compression spring one end of which is supported in the switch housing and the other end of which thrusts against the right-angled bent portion of the bimetal strip. In this manner there is obtained, on the one hand, a simple mechanical connection between the right-angled bent portion of the bimetal strip and the corresponding leg of the U-shaped compensation bimetal strip, and on the other hand, both electric and thermal insulation between the right-angled bent portion of the bimetal strip and the compensation bimetal strip.

In the event of the bimetal strip being directly heated the bimetal strip carrier is electrically connected with the right-angled bent portion of the bimetal strip by means of a stranded wire.

Figure 4:
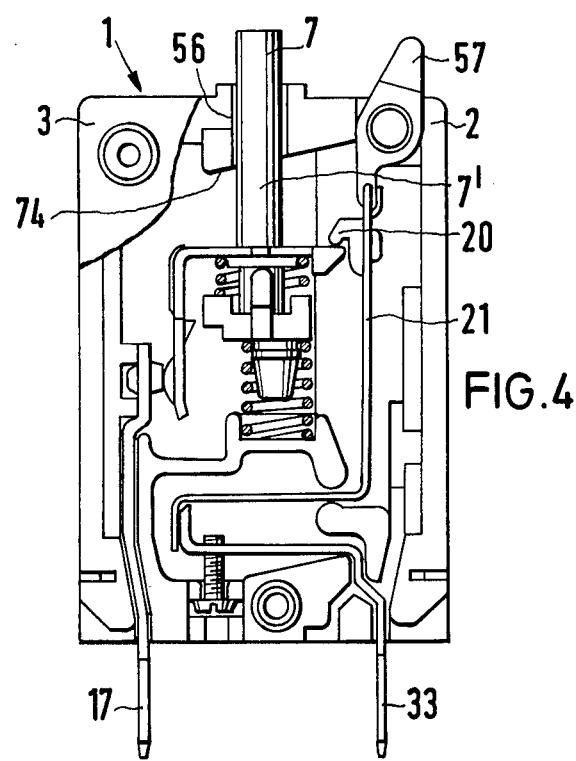
Figure 5:
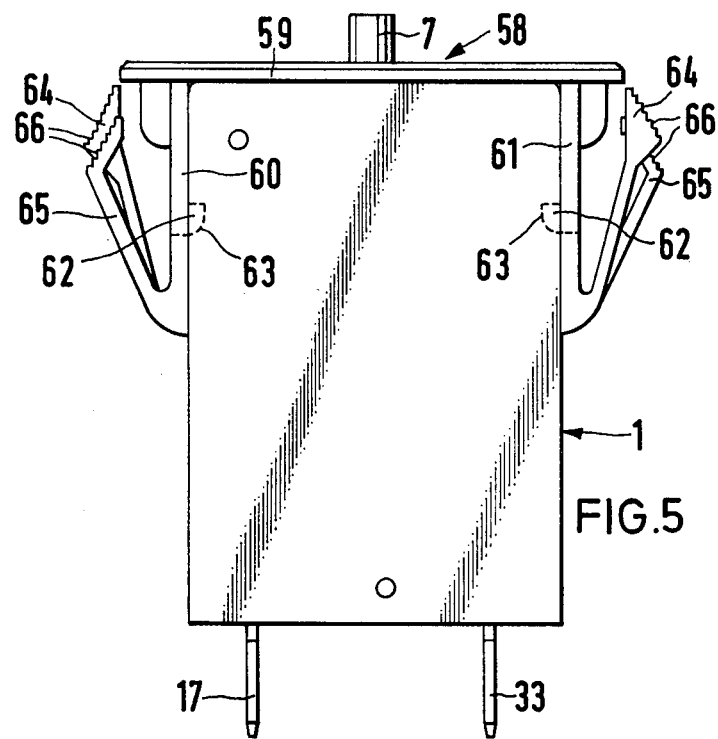
Figure 6:
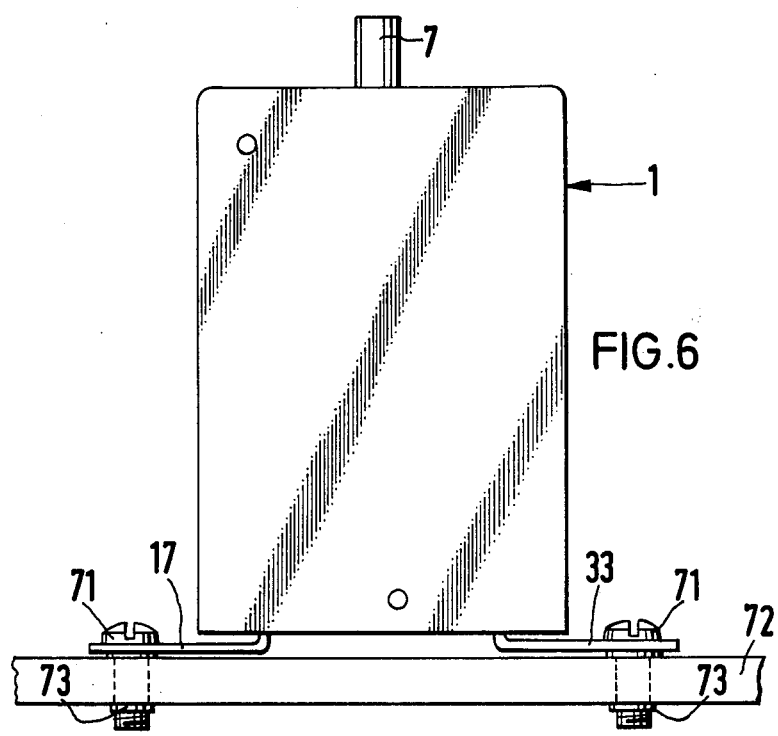
Figure 11:
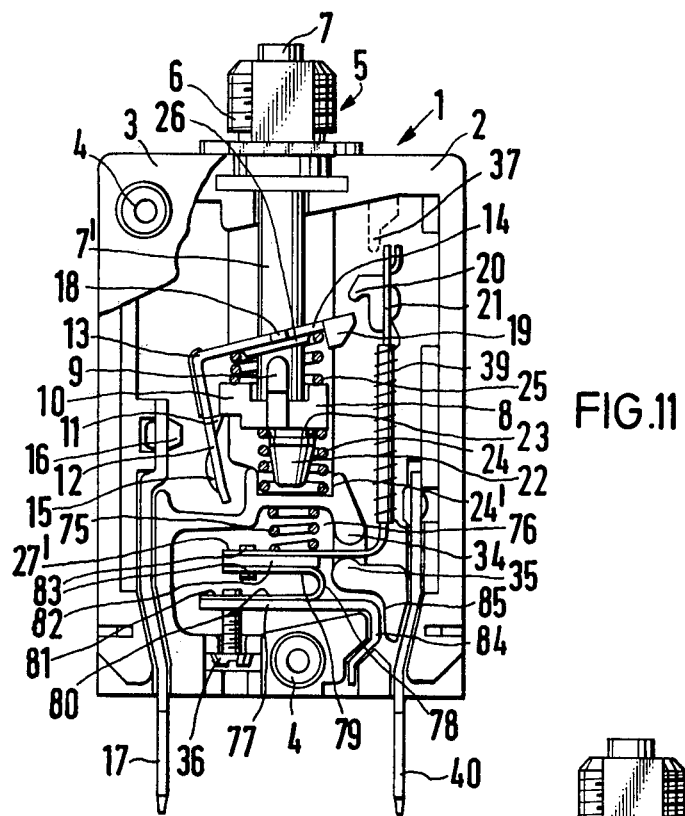
Figure 12:
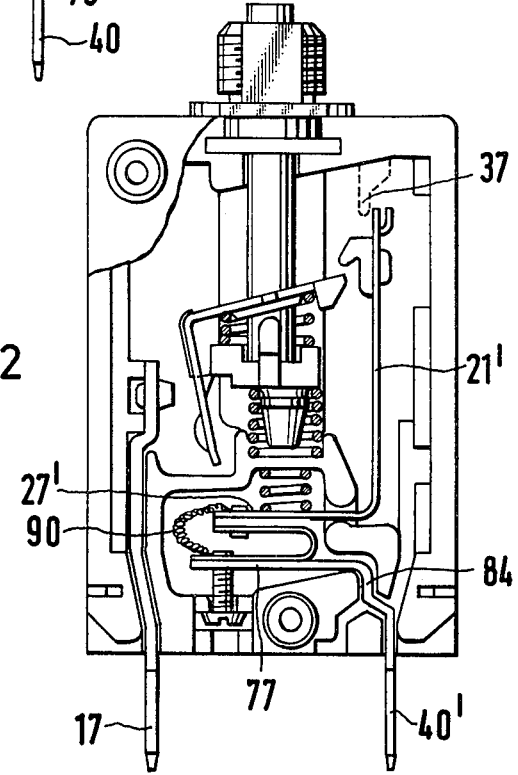

Exemplary embodiments of the invention are illustrated in the Figures which show:

FIG. 1 a view of an opened up excess current switch according to the invention in its OFF position, FIG. 2 a view similar to that of FIG. 1 in which the contact bridge is in a position just prior to attaining the ON position, FIG. 3 a view similar to that of FIG. 2, the contact bridge being in the ON position, FIG. 4 a view similar to that of FIG. 3, without threaded sleeve and with a two-armed lever for manual disconnecting, FIG. 5 a view of the closed excess current switch of FIG. 4 without two-armed lever and having an affixing frame of thermoplastic material, FIG. 6 a view of the excess current switch of FIGS. 1 to 3 without threaded sleeve and having two connecting lugs bent away from each other at right angles and threadably fastened to a printed circuit board, FIG. 7 the excess current switch of FIG. 5 in affixed condition, FIG. 8 a view of a bimetal strip of meander-shaped design, FIG. 9 a view from the right in FIG. 8 with the bimetal strip stabilised by connectors of synthetic material, FIG. 10 a view from the left in FIG. 9, FIG. 11 a view of an opened up excess current switch according to the invention in its OFF position, having an indirectly heated bimetal strip and a compensation bimetal strip, and FIG. 12 the same view of the excess current switch as FIG. 11 with a directly heated bimetal strip.

The illustrated excess current switch has a housing 1 comprised of a cup-shaped part 2 and a flat cover 3 which are interconnected by means of two hollow rivets 4. Into a corresponding recess of the cup-shaped part 2 there is untwistably inserted a threaded sleeve 5 of plastic material having an external thread 6 and adapted for a nut to be screwed thereon. The threaded sleeve 6 and the associated nut serve for securing the excess current switch to an affixing plate. The bore of the threaded sleeve 5 serves for guiding a pushbutton 7 or an actuating rod 7' which is provided with a connecting bridge 8 at its lower end. The connecting bridge 8 has two laterally disposed lugs 9 spaced from each other which are displaceably guided in vertical grooves of the cup-shaped part 2 and the flat cover 3. The connecting bridge 8 further has a driver 10 adapted to cooperate with a dog 11 of an arm 12 of a contact bridge 13 the other arm of which is designated by the numeral 14.

The arm 12 of the contact bridge 13 is provided with a contact piece 15 which contacts a stationary contact piece 16 when the contact bridge 13 is in the ON position according to FIG. 3. The fixed contact piece 16 is secured to a connecting lug 17. The arm 14 of the contact bridge 13 has at either side a guidance protuberance 18 which are guided in the same groove as the lugs 9 so as to be displaceable in the groove. The arm 14 further has at its free end a contact piece 19 behind which engages a retaining protuberance 20 of a bimetal strip 21, in the ON position according to FIG. 3.

The arm 14 of the contact bridge 13 is between the locating protuberances 18 provided with a bore through which the actuating rod 7' passes with play in such manner that the contact bridge 13 with its arm 14 can be pivoted on the lugs 9 of the connecting bridge 8. A stud 22 having an annular groove 23 is moulded to the connecting bridge 8. This annular groove 23 serves to receive the last upper turn of a disconnection spring 24 the lower end of which is supported in a corresponding recess 24' of the cup-shaped part 2. On the upper portion of the connecting bridge 8 bears a compression spring 25 which acts directly on the arm 14 of the contact bridge 13. In order to prevent the compression spring 25 sliding aside on the arm 14 of the contact bridge 13 the rim 26 of the bore in the arm 14 of the contact bridge 13 which is provided for the actuating rod 7' is downwardly pulled through so that a spring dish results for the compression spring 25. The rim 26 contacts the lugs 9.

The bimetal strip 21 has a right-angled bent portion 27 corresponding approximately to its length, the comparatively short end 28 of which is bent perpendicularly in the direction away from the bimetal strip 21 and is welded to a right-angled bent portion 29 of corresponding length of a bimetal strip carrier 30 situated parallel to the right-angled bent portion 27 of the bimetal strip 21 and having in the zone of the bimetal strip 21 a bent portion 31 directed away from the bimetal strip 21. The perpendicularly bent portion 31 is secured in a suitable groove-like recess 32 of the cup-shaped part 2 and forms a connecting lug 33 protruding from the housing. The cup-shaped part 2 has two substantially semicircular projections 34, 35 between which the right-angled bent portion 27 of the bimetal strip 21 is held with slight play. Into the lefthand end, according to FIGS. 1 to 3, of the bimetal strip carrier 30 there is screwed a setscrew 36 which is mounted rotatably but axially not displaceably in the cup-shaped part 2. Upon this setscrew 36 being tightened the bimetal strip carrier 30 and with it the right-angled bent portion 27 of the bimetal strip 21 are pivoted in counter-clockwise direction about the two projections 34, 35 and thereby the upper end of the bimetal strip 21 above the retaining protuberance 20 is urged against a stationary stop 37 of the flat cover 3, whereby the bimetal strip 21 may receive a certain bias. This bias is the greater the greater is the intensitiy of the releasing current of the excess current switch according to the invention. As is apparent from the Figures, the retention protuberance 20 of the bimetal strip 21 is situated vertically above the two projections 34, 35, so that the contact bridge 13 exerts on the bimetal strip 21 no bending forces but only traction forces which have no detrimental effects. In order to obtain easy bendability the point of bending 38 of the bimetal strip carrier 30 is of reduced cross-section.

While the bimetal strip 21 of FIG. 1 is directly heated, heating of the bimetal strip 21 of FIG. 2 is effected indirectly by a heating coil 39 which is electrically connected on the one hand with the bimetal strip 21 proximate the retention protuberance 20 and on the other hand with a connecting lug 40. In case of need, the bimetal strip carrier 30 may also be provided with a connecting lug 41.

As is apparent from FIGS. 1 and 2 the connecting lugs 17, 33, 40, 41 are formed as plug junctions.

In the excess current switch according to FIG. 3 there are provided connecting lugs 17' and 33' which are provided with clamping screws 42. This excess current switch has a meander-shaped bimetal strip 21' illustrated in FIGS. 8 to 10.

FIG. 8 shows that a median portion 43 of the bimetal strip 21' is slit in such a way that is is subdivided into three parallel arms 44, 45, 46 situated longitudinally of the bimetal strip 21'. All the arms 44, 45, 46 are connected in series. The two outer arms 44 and 46 are in mechanical and electrical connection with portions 47 and 48 of the bimetal strip 21' which are not slit, i.e. have no arms. The portion 47 has a square aperture 49 into which the retention protuberance 20 is inserted with a corresponding peg and riveted to the portion 47.

For the purpose of stabilising the bimetal strip 21' connectors 52 and 53 of insulating material are provided in the zones 50 and 51 which connectors firmly connect the interconnected ends 54 and 55 of the neighbouring arms 44, 45 and 45, 46 with the third arm 46 or 44 and the not slit, that is not having arms, portions 47 and 48. In view of the fact that when directly heated the bimetal strip 21' may reach elevated temperatures of about 200° C a thermosetting plastic material, e.g. a glass-fibre reinforced polyester resin is used as insulating material for the connectors 52, 53. As can be seen in FIG. 3, the connector 53 is disposed on the rectangularly bent portion 27 of the bimetal strip 21' so that the slitting of the bimetal strip 21' reaches right into its rectangularly bent portion 27.

In the excess current switch according to FIG. 4 the threaded sleeve 5 has been omitted. The pushbutton 7 or the actuating rod 7' is now displaceably mounted in a corresponding recess 56 of the cup-shaped part 2. For the purpose of manual tripping there is provided a two-armed lever 57 upon counter-clockwise pivoting of which the bimetal strip 21 is pivoted in clockwise sense relative to the projections 34, 35 until its retention projection 20 releases the contact bridge 13 for displacement into the OFF position.

The excess current switch of FIG. 5 has the same housing as the excess current switch of FIGS. 1 to 3, but has no threaded sleeve 5. For the purpose of affixing this excess current switch there serves an affixing frame 58 of thermoplastic synthetic material which is adapted to be fitted onto the upper portion of the housing 1 in a simple manner. To an elongate, plate-shaped element 59 of the affixing frame 58 lateral elements 60, 61 situated perpendicular thereto are unitarily moulded, each lateral element having a stud 62 engaging into a corresponding recess 63 of the part 2, whereby an unshiftable affixing of the affixing frame 58 on the housing 1 results. To the lower end of each lateral element 60, 61 there are moulded, according to FIG. 5, two respective resilient supporting arms 64, 65 provided with steps 66. According to FIG. 7, when the housing 1 having the affixing frame 58 is inserted into a corresponding recess of an affixing plate 67 or 68 a step 66 of an elastic supporting arm 64 or 65 comes into engagement with a corresponding edge 69 or 70 of the opening in the affixing plate 67 or 68, so that a simple and safe affixing of the excess current switch to the affixing plates 67, 68 is thereby obtained. FIG. 7 shows an affixing plate 67 at the right side and an affixing plate 68 at the left side.

In the excess current switch according to FIG. 6 the two connecting lugs 17, 33 are perpendicularly bent away from one another and secured to a printed circuit board 72 with the aid of screws 71. The printed circuit board 72 is provided with a printed circuit. Threaded bushings 73 for the screws 71 are riveted in at appropriate connection points. These threaded bushings 73 are soldered to corresponding electric conductors. By virtue of the screws 71 the excess current switch is both electrically connected and mechanically secured.

When an excess current occurs in the ON position according to FIG. 4, then the bimetal strip 21 is bowed in clockwise direction until its retention projection 20 releases the contact bridge 13 at its contact piece 19, so that, under the action of the compression spring 25, the contact bridge 13 is moved into the OFF position in which the arm 14 of the contact bridge 13 abuts against an oblique stop 74 of the cup-shaped part 2. This release results also then, when the pushbutton 7 is held firmly depressed in its position according to FIG. 2. This release is a trip-free release effected by the compression spring 25.

When the pushbutton 7 has been freed it is brought into the OFF position according to FIG. 1 by the disconnection spring 24. The disconnection spring 24 is of stronger design than the compression spring 25 which is compressed by the force of the disconnection spring 24.

As already mentioned, tripping can also be effected by actuation of the two-armed lever 57. Disconnection by the compression spring 25 or by the disconnection spring 24 is a quick break or instantaneous disconnection.

When the pushbutton 7 is actuated in the OFF position of FIG. 1 the driver 10 of the connecting bridge 8 entrains the dog 11 of the contact bridge 13 and brings the latter into the position according to FIG. 2. The contact piece 19 of the contact bridge 13 is now underneath the retention projection 20 so that upon the pushbutton being freed the contact piece 19 arrives in contact with the retention projection 20. Under the action of the compression spring 25 or of the disconnection spring 24 the contact bridge 13 is then pivoted clockwise about the retention projection 20 as fulcrum. Meanwhile the dog 11 of the contact bridge 13 slides along the driver 10 until the dog 11 slides off the driver 10 and thereafter the contact bridge performs an abrupt clockwise pivoting movement under the action of the compression spring 25 or the disconnection spring 24, whereby the contact piece 15 of the contact bridge 13 comes in abutment at the fixed contact piece 16. The contact bridge 13 is now in the ON position according to FIG. 4 or FIG. 3. The abrupt engagement of the contact bridge 13 represents a quick make or instantaneous switch-on whereby the contact pieces 15 and 16 are little worn.

The excess current switch according to FIG. 11 is of substantially the same construction as the excess current switch according to FIG. 2. The only difference resides therein that the excess current switch of FIG. 11 has a compensation bimetal strip.

In the excess current switch according to FIG. 11 the bimetal strip 21 also has a right-angled bent portion 27' approximately corresponding to its length, against which a compression spring 75 supported in a recess 76 of the switch housing 1 exerts pressure. Between a bimetal strip carrier 77 and the right-angled bent portion 27' there is provided a substantially U-shaped compensation bimetal strip 78 having two legs 79 and 80. The leg 80 is welded to the bimetal strip carrier 77 at the point 81. Between the right-angled bent portion 27' of the bimetal strip 21 and the leg 79 of the compensation bimetal strip 78 there is present an insulating platelet 82 having studs 83 moulded on at either side, which studs pass through corresponding bores of the right-angled bent portion 27' of the bimetal strip 21 and the leg 79 of the compensation bimetal strip 78. The bimetal strip carrier 77 has a perpendicularly bent portion 84 directed away from the bimetal strip 21 and secured in a corresponding groove-like recess 85 of the cup-shaped part 2. The right-angled bent portion 27' of the bimetal strip 21 is retained with some slight play between the two substantially semicircular projections 34 and 35.

In the excess current switch according to FIG. 12, where a directly heated bimetal strip 21' is provided, the right-angled bent portion 27' of the bimetal strip 21' is electrically connected to the bimetal strip carrier 77 by a stranded wire 90. According to FIG. 12 the perpendicularly bent portion 84 of the bimetal strip carrier 77 merges into a connecting lug 40' protruding from the switch housing 1.

Since the bimetal strip 21 or 21' bows toward the right according to FIGS. 11 and 12 when a rise in temperature occurs, such bowing, which also occurs upon a rise of the environmental temperature, is compensated for in that the compensation bimetal strip 78 bows with its leg 79 in anti-clockwise direction. This bowing of the bimetal strip 21, 21' is counter-acted by the right-angled bent portion 27' of the bimetal strip 21 or 21' since the compression spring 75 urges the right-angled bent portion 27' of the bimetal strip 21 or 21' and the insulating platelet 82 against the correspondingly bowed leg 79 of the compensation bimetal strip 78.

I claim:
1. A pushbutton actuated excess current switch comprising:
    a housing,
    a pushbutton slidably mounted in said housing, an actuating rod rigidly connected to the pushbutton,
    a connecting bridge rigidly connected to said actuating rod,
    a driver member on said connecting bridge, two lugs on said connecting bridge,
    a stud rigidly connected to the connecting bridge and pointing in a direction away from the actuating rod, said stud having a spring retaining groove,
    a disconnection spring disposed between said stud and an abutment in said housing,
    a contact bridge in the form of angled lever freely pivotably carried by said lugs of the connecting bridge and being displaceable in the axial direction of said actuating rod counter to the force of a second spring supported by the connecting bridge,
    a dog on said angled lever being arranged to be engaged and entrained by said driver member of the connecting bridge upon switching-on,
    an oblique stop in said housing against which the contact bridge is urged by the lugs upon switching-off,
    a bimetal strip being directly or indirectly heated and having first and second portions extending substantially at right angles to each other, the first portion which is substantially co-extensive with the actuat- ing rod, having a retaining protuberance which is engageable behind the contact bridge to maintain the contact bridge in the switched-on position, the end of the second portion being connected to a bimetal strip carrier which is co-extensive with the second portion, the carrier having an end portion which is directed away from the bimetal strip and is retained in a groove formed in the housing, the first and second portions of the bimetal strip are of substantially equal length, two substantially semi-circular projections disposed in the housing to retain, with free play, the second portion of the bimetal strip, the two projections being situated on an imaginary line which extends substantially parallel to the first portion and passes through the protuberance of the bimetal strip, a setscrew engageable with the bimetallic strip carrier at a position adjacent the connection to the bimetal strip, the setscrew being rotatable only relative to the housing.

2. A switch as claimed in claim 1, wherein the pushbutton, the actuating rod, the connecting bridge and the stud are formed unitarily of a synthetic material.

3. A switch as claimed in claim 1, wherein an externally threaded sleeve of synthetic material is inserted in the housing, for guiding the pushbutton or the actuating rod and serves for affixing the switch housing.

4. A switch as claimed in claim 1, wherein a portion of the directly heated bimetal strip intermediate its ends, is subdivided into three or a greater number of oddnumbering parallel arms positioned longitudinally of the bimetal strip and connected in series and the interconnected ends of two neighbouring arms are firmly connected by means of connectors of insulating material with the third arm and the undivided end portions of the bimetal strip.

5. A switch as claimed in claim 1, wherein an affixing frame of thermoplastic material is fitted on the housing and contacts its pushbutton side with an elongate plate-like element and oppositely situated narrow sides of the housing with two shorter lateral elements positioned perpendicular to the plate-like element, unitarily moulded studs directed toward one another are formed on the shorter lateral elements, the studs engaging into corresponding recesses of the oppositely situated narrow sides of the housing, and to the free ends of the lateral elements there are unitarily moulded outwardly directed supporting arms diverging from the lateral elements, steps being provided on the supporting arms which bear with their steps on oppositely situated edges of a recess in an affixing plate when the housing has been introduced into the recess.

6. A switch as claimed in claim 5, wherein each lateral element of the affixing frame having two supporting arms of different thickness moulded thereon, the thicker supporting arm serving to secure the housing to thicker affixing plates and the thinner supporting arm serving for securing the housing to thinner affixing plates.

7. A switch as claimed in claim 1, having at least two connecting lugs bent at right angles away from one another, the lugs being secured by screws to threaded bushings secured in a printed circuit board.

8. A switch as claimed in claim 1, wherein a stationary stop is provided in the housing against which the first portion of the bimetal strip rests in the cool condition, the end of the stop being proximate to the retaining protuberance.

9. A switch as claimed in claim 1, wherein the end of the second portion is bent away from the bimetal strip and is connected to a bent end portion of the bimetal strip carrier.

10. A switch as claimed in claim 1, wherein between the bimetal strip carrier and the second portion of the bimetal strip there is disposed a substantially U-shaped compensation bimetal strip, one leg of which contacts the second portion of the bimetal strip and the other leg of which contacts the bimetal strip carrier.

11. A switch as claimed in claim 10, wherein an insulating platelet is provided between the one leg of the compensation bimetal strip and the second portion of the bimetal strip.

12. A switch as claimed in claim 11, wherein the other leg of the compensation bimetal strip is secured to the bimetal strip carrier.

13. A switch as claimed in claim 11, wherein the insulating platelet has at either side studs which engage into corresponding bores of the second portion of the bimetal strip and of the one leg of the U-shaped compensation bimetal strip, and a compression spring is provided having one end supported in the switch housing the other end exerting pressure on the second portion of the bimetal strip.

14. A switch as claimed in claim 13, wherein the bimetal strip carrier is electrically connected to the second portion of the directly heated bimetal strip by means of a stranded wire.

* * * * *

UNITED STATES PATENT OFFICE
CERTIFICATE OF CORRECTION

Patent No. 4,044,325   Dated August 23, 1977

Inventor(s) Fritz Krasser et al.

It is certified that error appears in the above-identified patent and that said Letters Patent are hereby corrected as shown below:

In the drawing, Sheet 1, Fig. 1, the lead line emanating from reference numeral 30 should be lengthened to indicate the bimetal strip carrier, as shown on the attached sheet.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,044,325      Dated August 23, 1977

Inventor(s) Fritz Krasser et al.

It is certified that error appears in the above-identified patent and that said Letters Patent are hereby corrected as shown below:

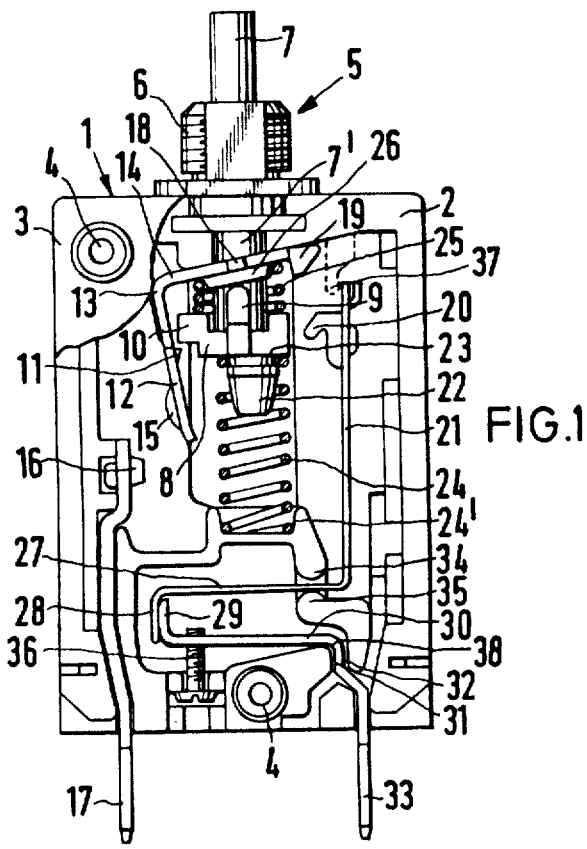

FIG.1